United States Patent [19]
Coutts

[11] Patent Number: 5,533,157
[45] Date of Patent: Jul. 2, 1996

[54] OPTICAL FIBER CONNECTOR BIASING ARRANGEMENT

[75] Inventor: Bruce Coutts, Costa Mesa, Calif.

[73] Assignee: ITT Corporation, Secaucus, N.J.

[21] Appl. No.: 952,549

[22] PCT Filed: Nov. 2, 1992

[86] PCT No.: PCT/US92/09403

§ 371 Date: Dec. 10, 1992

§ 102(e) Date: Dec. 10, 1992

[87] PCT Pub. No.: WO94/10593

PCT Pub. Date: May 11, 1994

[51] Int. Cl.⁶ ............................................. G02B 6/36
[52] U.S. Cl. ................................. 385/53; 385/147
[58] Field of Search ..................... 385/53–55, 88–93, 385/147

[56] References Cited

U.S. PATENT DOCUMENTS

| | | | |
|---|---|---|---|
| 3,573,720 | 4/1971 | Reynolds | 339/217 |
| 3,902,784 | 9/1975 | Dakss et al. | 350/81 |
| 4,113,333 | 9/1978 | Horowitz | 339/14 |
| 4,155,624 | 5/1979 | Logan et al. | 385/59 X |
| 4,258,977 | 3/1981 | Lukas et al. | 385/59 X |
| 4,362,350 | 12/1982 | von Harz | 339/143 |
| 4,516,829 | 5/1985 | Borsuk et al. | 350/96.20 |
| 4,687,291 | 8/1987 | Stape et al. | 385/59 |
| 4,698,030 | 10/1987 | Ryll et al. | 439/752 |
| 4,767,176 | 8/1988 | Pohl | 350/96.20 |
| 4,804,243 | 2/1989 | Borsuk et al. | 350/96.20 |
| 4,936,798 | 6/1990 | Hass et al. | 439/752 |
| 5,125,056 | 6/1992 | Hughes et al. | 385/59 |
| 5,157,749 | 10/1992 | Briggs et al. | 385/59 X |
| 5,283,848 | 2/1994 | Abendschein et al. | 385/59 |

FOREIGN PATENT DOCUMENTS

| | | |
|---|---|---|
| 0128044 | 12/1984 | European Pat. Off. . |
| 61-204608 | 10/1986 | Japan . |
| 3118507 | 5/1991 | Japan . |
| 2119954 | 11/1983 | United Kingdom . |

Primary Examiner—Akm E. Ullah
Attorney, Agent, or Firm—Thomas L. Peterson

[57] ABSTRACT

An optical fiber connector is described for holding the front ends of optical fibers and biasing them forwardly against the ends of mating optical fibers, which has an improved biasing arrangement. The front end of each optical fiber is held by a terminus arrangement that includes a terminus body (40, FIG. 3) that is mounted on a yoke (62) but which can shift forward and backward with respect to the yoke. The terminus body is biased forwardly (F) by a sheet metal leaf (92) with a forwardly-bowed middle (98) that abuts a forward shoulder (100) on the terminus body, and with opposite end parts (94, 96) that bear against a front surface (102) of the yoke. The bodies are installed by sliding them into slots 111–113 (FIG. 2) of the yoke.

19 Claims, 4 Drawing Sheets

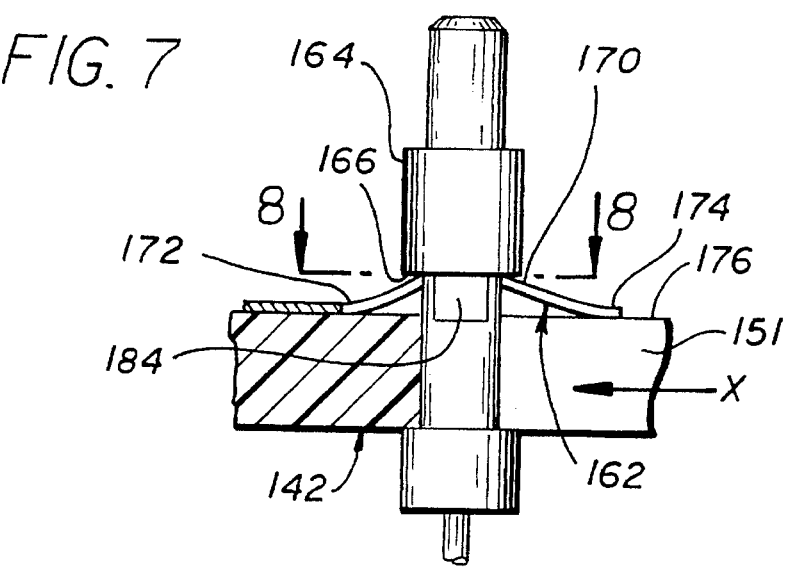
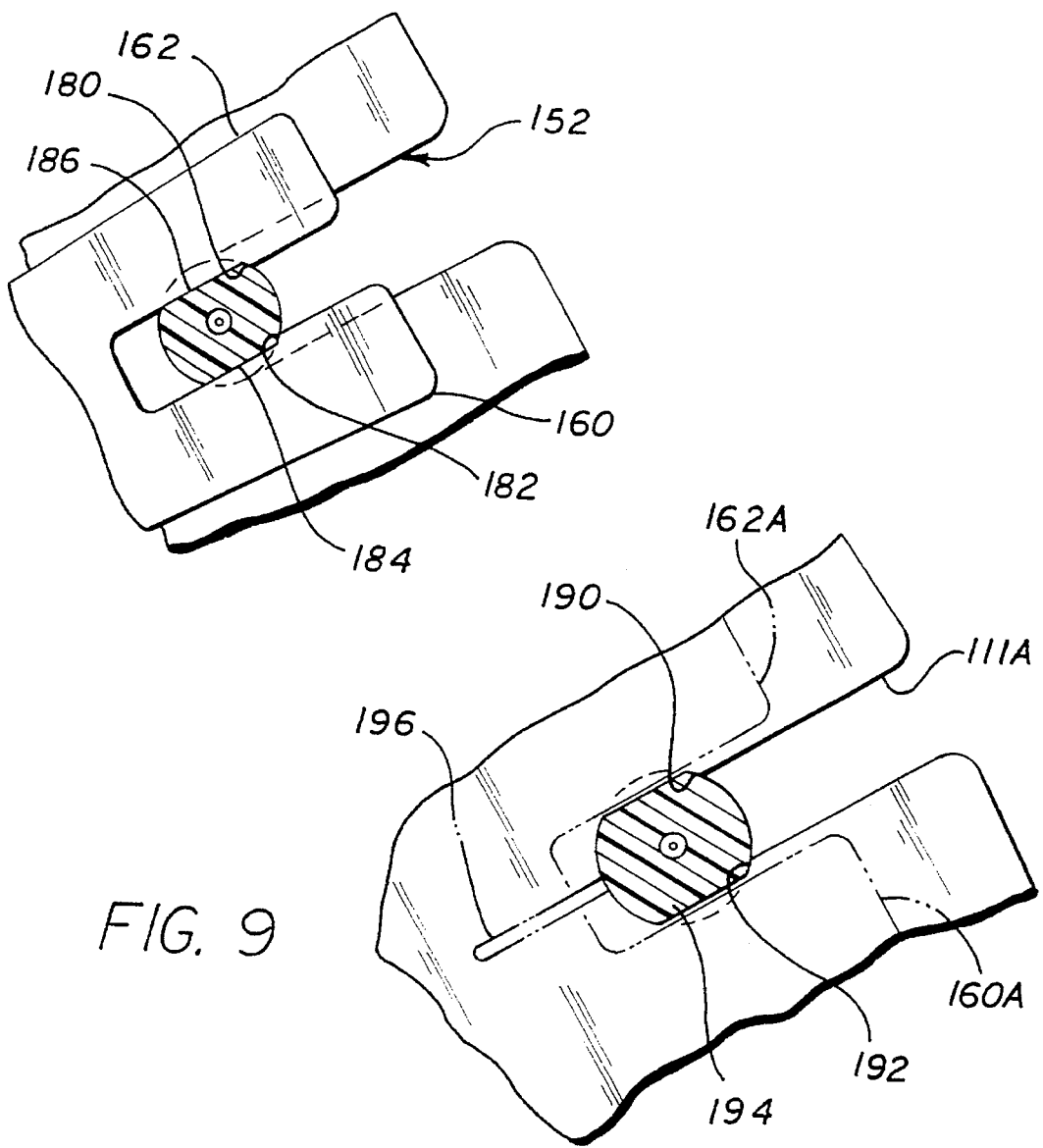

5,533,157

OPTICAL FIBER CONNECTOR BIASING ARRANGEMENT

BACKGROUND OF THE INVENTION

A common way to connect the front ends of two optical fibers is to polish their tips and have the tips abut each other. Due to the fact that the tips of the optical fibers have small diameters (e.g. 0.005 inch or 0.13 millimeter) they are commonly mounted in a cylindrical tip member that lies in a ferrule, or terminus body. The terminus body is mounted on the yoke of a connector which attaches to another connector that holds the other optical fiber. The terminus body must have some resilience in moving towards and away from the other optical fiber, in order to assure that the tips will abut despite some tolerances in how close the fiber tips approach each other when the connector housings are connected. U.S. Pat. Nos. 4,516,829 and 4,804,243 by Borsuk et al describe the use of coil springs to bias the terminus bodies forwardly and allow them to deflect rearwardly. However, coil springs require additional space and add to the difficulty of mounting the terminus assemblies, especially in a multi-fiber arrangement where several terminus bodies are to be individually resiliently mounted on a yoke. Apparatus that simplified and compacted the biasing portion of the optical fiber assembly and which otherwise facilitated mounting of the terminus bodies on the yoke, would be of value.

SUMMARY OF THE INVENTION

In accordance with one embodiment of the present invention, an optical fiber connector is provided that resiliently mounts a terminus assembly on a yoke of the connector housing, in a simple manner. The yoke has a hole and the terminus body lies in the hole, with a forward shoulder on the body lying slightly forward of the yoke front surface and a rear shoulder lying behind the yoke rear surface. The terminus body is biased forwardly by a leaf spring portion of a spring member. The leaf spring portion has a forwardly bowed middle that engages the forward shoulder of the terminus body, and has opposite end parts that abut the yoke front surface. Where two or more terminus assemblies are to be mounted in holes in the yoke, a single spring member can be used which has two or more leaf spring portions.

The hole in the yoke can be in the form of a slot that extends from the periphery of the yoke. This enables mounting of each terminus body separately by sliding it sidewardly along the slot. In one arrangement, the spring member is movable on the yoke, so after the terminus body is installed, the spring member is moved to move the middle of the leaf spring portion against the front shoulder of the body. In another version, the leaf spring portion lies beside the slot, and as the body is slid into the slot its front shoulder slides over the middle of the leaf spring portion.

The novel features of the invention are set forth with particularly in the appended claims. The invention will be best understood from the following description when read in conjunction with the accompanying drawings.

BRIEF DESCRIPTION OF THE DRAWINGS

FIG. 7 is a view taken on the line 7—7 of FIG. 6.

FIG. 8 is a view taken on line 8—8 of FIG. 7.

FIG. 9 is a partial sectional view of a modified form of the apparatus of FIG. 8.

DESCRIPTION OF THE PREFERRED EMBODIMENTS

Figure 1:
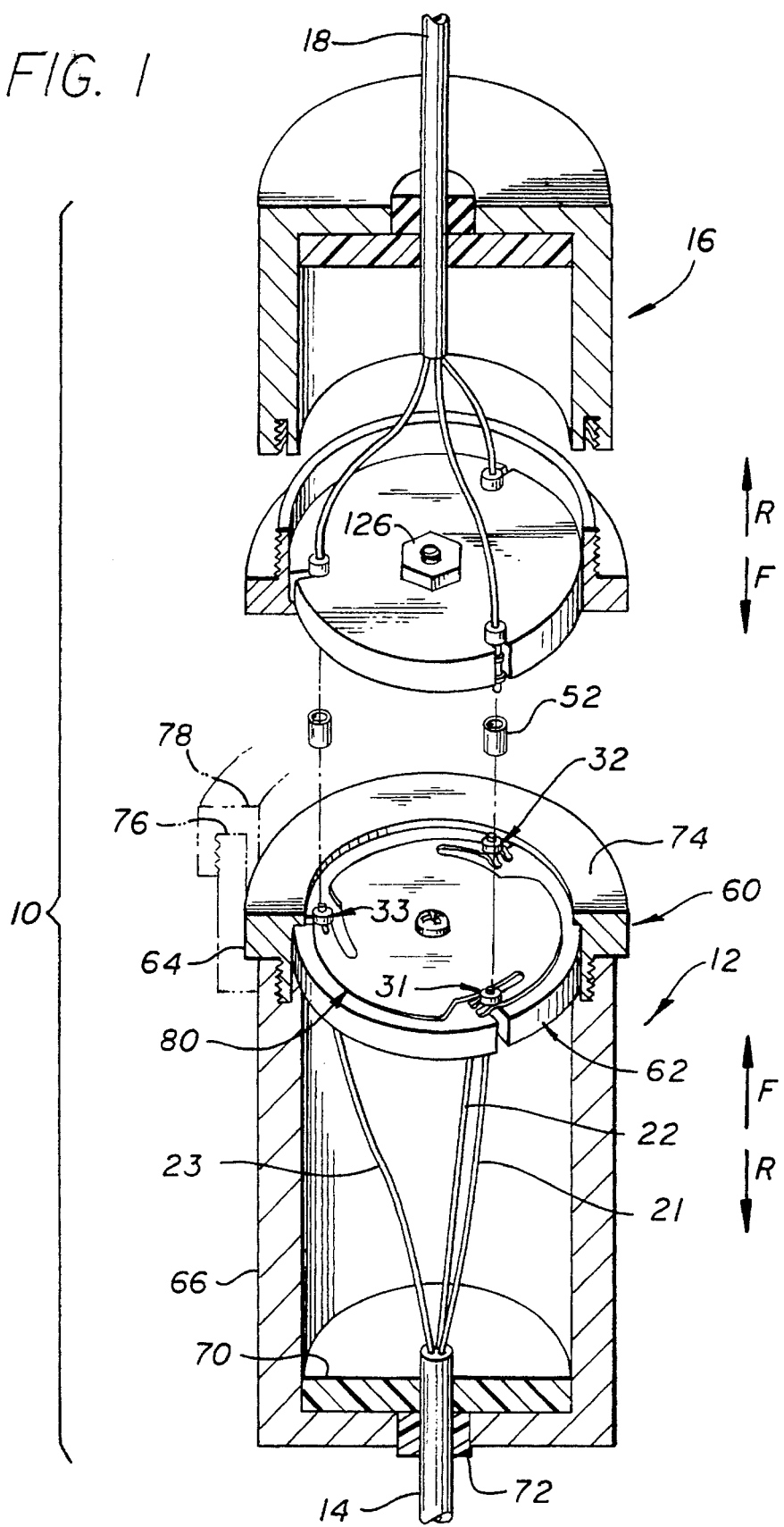
FIG. 1 is a partially sectional, exploded, and isometric view of a connector assembly constructed in accordance with one embodiment of the present invention.

FIG. 1 illustrates a connector assembly 10 which includes a first connector 12 attached to a first optical fiber assembly 14 and a second connector or connector device 16 which is attached to a second optical fiber assembly 18. Each optical fiber assembly includes three optical fibers that must be connected to the three optical fibers of the other assembly. The first fiber assembly 14 has three buffered fibers 21–23, each containing an optical fiber, and each coupled to a different one of three terminus assemblies or assembly devices 31–33.

Figure 3:
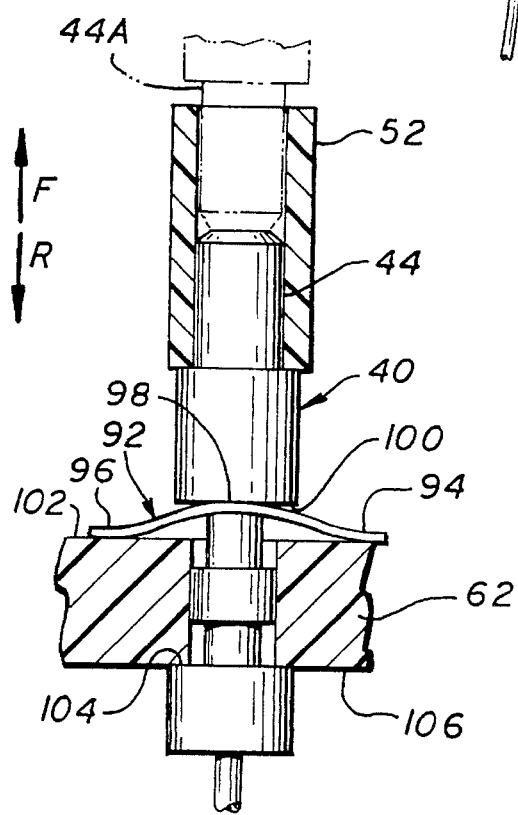
FIG. 3 is a partially sectional side view of the connector assembly of FIG. 1, showing a terminus assembly and a portion of the surroundings thereof, prior to full mating of the connectors.
Figure 5:
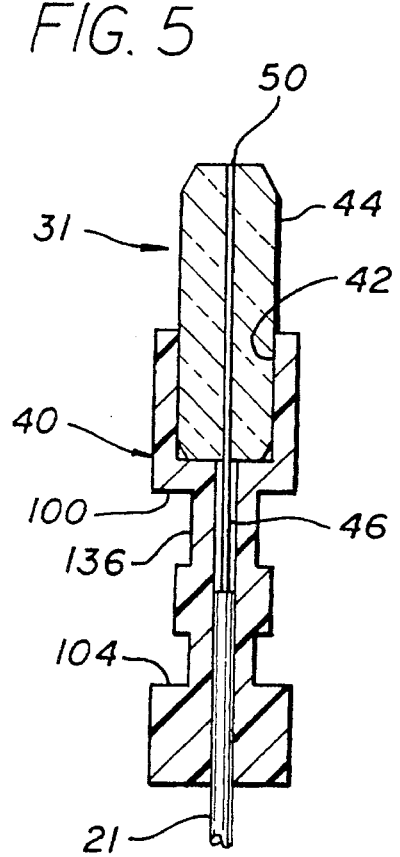
FIG. 5 is a sectional view of the terminus assembly of the apparatus of FIG. 3.

As shown in FIG. 5, each terminus assembly such as 31 includes a terminus body or body device 40, with a recess 42 in its forward end which receives a tip member 44. The buffered fiber 21 includes a small diameter optical fiber 46 which extends through a hole in the tip member 44 and which is joined to the tip member. The extreme front end 50 of the optical fiber lies even with the extreme front end of the tip member 44. As shown in FIG. 3, the front end of the tip member 44 and of a mating tip member 44A which holds a corresponding mating optical fiber, are coupled by having their tips abut each other. A sleeve 52 closely surrounds the tip members to assure that they and the optical fibers are accurately aligned with each other.

As shown in FIG. 1, each connector has a housing 60 which includes a yoke 62 to which each of the terminus assemblies 31–33 are mounted. The yoke is trapped between a front shell 64 and a back shell 66. A strain relief member 70 at the rear of the back shell holds the fiber assembly 14, while a seal 72 is used to seal out moisture. The two substantially identical connectors are mated by moving each of them forwardly in a corresponding direction F towards the other until front surfaces 74 of the front shells abut each other. The front shells then can be securely attached as by an attachment device that includes two threadably connected members 76, 78. When the front surfaces 74 of the front shells abut, it is important that the tips of the mating optical fibers, on the terminus bodies which are mounted on the two connectors, also abut. A spring member 80 serves to resiliently bias the terminus bodies in a forward direction F while allowing them to deflect slightly rearwardly in a rearward direction R, to assure fiber tip abutting.

Figure 2:
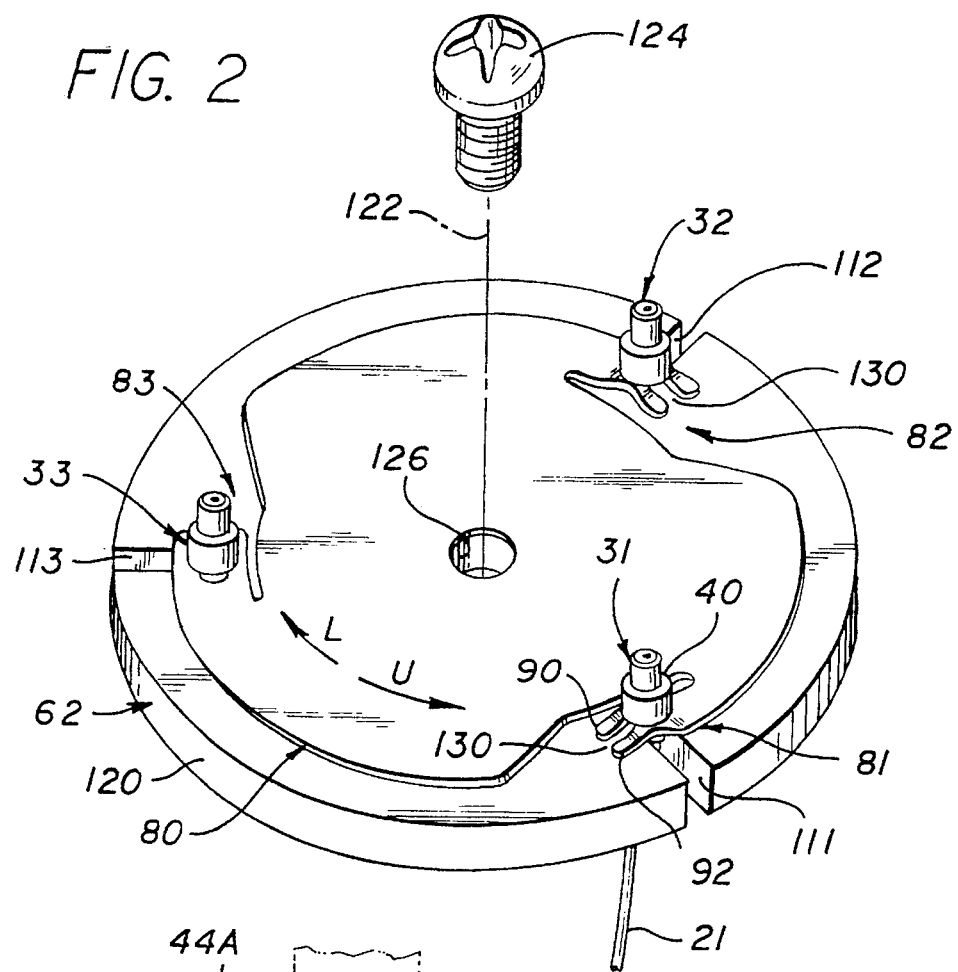
FIG. 2 is an exploded isometric view of a portion of one of the connectors of the assembly of FIG. 1.
Figure 4:
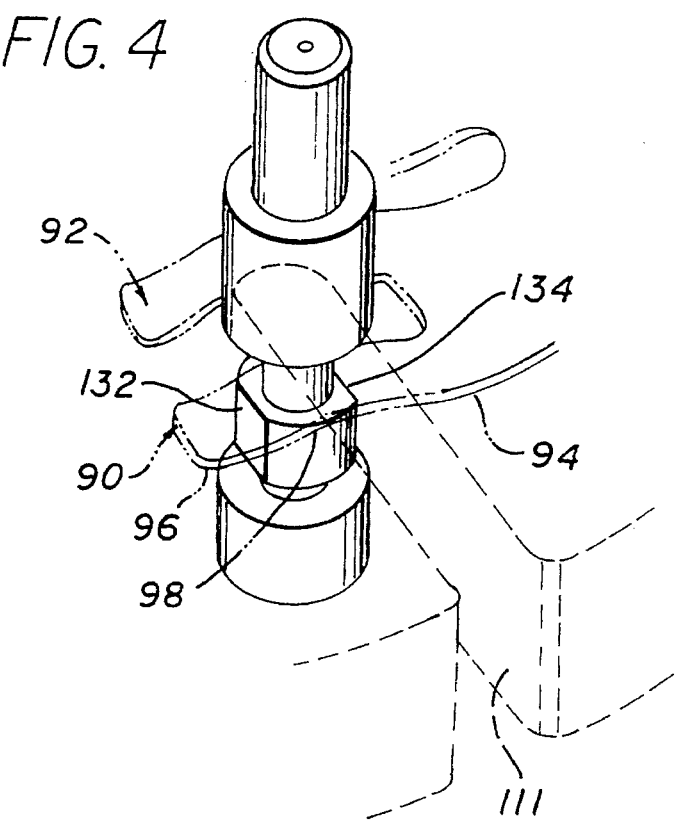
FIG. 4 is a partial isometric view of the apparatus of FIG. 3, with a portion of the spring member and yoke shown in phantom lines.

As shown in FIG. 2, the spring member 80 is of the sheet metal type, and has three leaf spring portions or regions 81–83 which each serve to resiliently mount corresponding ferrules or terminus bodies 40 on the yoke 62. Each leaf spring portion such as 81 includes a pair of leaves, or leafs 90, 92 that lie on opposite sides of the terminus body. As shown in FIGS. 3 and 4, each leaf includes first and second opposite end parts 94, 96 and a forwardly-bowed middle 98. The terminus body has a forward shoulder 100 that abuts the middle 98 of each of the leafs 90, 92, to enable the leafs to bias the body in the forward direction F. The first and second end parts 94, 96 of each leaf are supported on a front surface 102 of the yoke 62. The terminus body has a rear shoulder 104 that abuts the rear surface 106 of the yoke when the connectors are not mated.

As shown in FIG. 2, the yoke has three holes, or hole regions, in the form of slots 111–113 that each receives one of the terminus assemblies such as 31. Each slot extends to the periphery 120 of the yoke. With the optical fiber mounted on the tip member and terminus body, the terminus assembly can be moved substantially sidewardly (perpendicular to the forward and rearward directions) into one of the slots. The spring member 80 can pivot on the yoke 62 in a lock direction L and a release or unlock direction U, about a pivot axis 122. A screw 124 projects through holes 126 in the spring member and yoke, and is attached to a lock nut (126 in FIG. 1). Initially, the spring member 80 has been turned in the unlock direction U away from the position shown in FIG. 2. All three terminus assemblies 31–33 are then each installed in one of the corresponding slots 111–113. Then the spring member 80 is turned in the lock direction L to cause the leaf spring portions 81–83 to project under the forward shoulders of the terminus bodies, with each body being received through the gap 130 between the second ends of the leafs 90, 92. With the spring member turned fully in the lock direction, the middles of the leafs press upwardly against the bodies to resiliently urge them forwardly.

It may be noted that each of the bodies has a center portion with a pair of flat surfaces 132, 134 (FIG. 4) that lie closely within the slot 111, to prevent rotation of the body. It is also possible to provide flats at the location 136 (FIG. 5) immediately below the forward shoulder 100, to allow the sides of the spring leafs to prevent rotation of the body.

Figure 6:
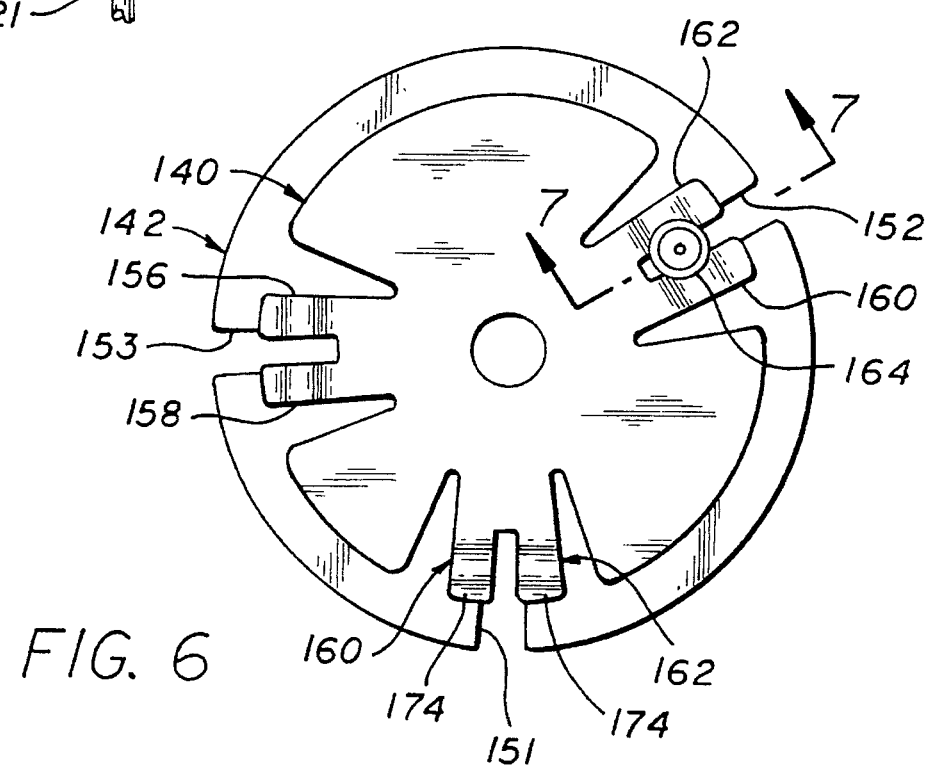
FIG. 6 is a plan view of a yoke and spring member constructed in accordance with another embodiment of the invention.

FIG. 6 illustrates a spring member 140 constructed in accordance with another embodiment of the invention, and shown mounted on a yoke 142 that can be mounted in place of the yoke of FIGS. 1–5. The yoke 142 has three slots 151–153 that are largely similar to those of the yoke of FIG. 1. The spring member 140 has a pair of leafs 160, 162 which lie on opposite sides of a corresponding slot 151, instead of both extending largely perpendicular to the slot. Each leaf has edges 156, 158 extending substantially parallel to the length of the adjacent slot. As shown in FIG. 7, when the terminus body 164 has been slid fully in the direction X into the slot 151, the body forward shoulder 166 is pressed forwardly by the middle 170 of the leaf 162, while opposite end parts 172, 174 of the leaf bear against the upper surface 176 of the yoke. The second ends 174 of the two leafs 160, 162 (FIG. 6) bear against yoke locations on opposite sides of the slot 151. The terminus body 164 can be trapped against moving out of the slot, by forming retainer ledges 180, 182 (FIG. 8) on the spring leafs. The engagement of the spring leafs with a pair of flats 184, 186 on a middle portion of the body serves to prevent turning of the body. FIG. 9 illustrates a similar situation, but where the walls of the slot 111A include latch shoulders 190, 192 that trap a flattened middle portion 194 of the body middle in the slot and prevent it from turning. The yoke can be provided with a slit indicated at 196 to enable the slot walls to slightly spring apart and together. The leafs 160A, 162A of the spring member are shown in phantom lines.

The use of leaf spring leafs to bias the terminus body forwardly, enables biasing to be achieved in a low cost spring member of small size in the forward and rearward directions. Also, where more than one terminus assembly is mounted in the connector, a single sheet metal-like spring member can serve to bias all of the terminus bodies. With a movable spring member, such as the pivoting one shown in FIGS. 1–5, the spring member that biases the terminus bodies forwardly, can also be used to lock them in place. Such locking also can be achieved with a stationary spring member. The provision of slots extending to the periphery of the yoke member, facilitates mounting of the terminus assembly, by merely moving it sidewardly through a slot. This enables individual terminus members to be moved separately into place, as opposed to requiring delicate movement of the yoke while all terminus bodies are maintained in alignment with corresponding cylindrical holes in the yoke. It is also possible to provide a key-shaped slot (in the yoke and/or the spring), with the terminus body inserted into the wide portion and then slid to a position in the narrow portion of the key slot. However, it is possible for the holes to be simple cylindrical or other holes rather than slots, although in that case, the front portion of the terminus body which forms the forward shoulder, must have a smaller diameter than each hole to fit through the hole. This requires that the body portion forming the forward shoulder, be of even smaller width. It is noted that the optical fibers should be kept as straight as possible to minimize losses of light passing therethrough. Some slack is required for installation, but the springs reduce the slack by advancing the terminus and fiber slightly.

Thus, the invention provides an optical fiber connector of relatively simple design, which facilitates the mounting of one or more terminus bodies on a yoke of the connector housing. A spring member is provided that has a leaf spring portion with leafs each having a forwardly-bowed middle that biases the terminus body forwardly. A single sheet metal spring member can be provided with a plurality of leaf spring portions. The hole in the yoke which receives the terminus body, can be in the form of a slot that extends to the periphery of the body, to facilitate installation of the terminus assembly. Each leaf spring portion preferably includes two leafs lying on opposite sides of the body, with first and second opposite end parts of each leaf bearing against a front surface of the yoke. It is possible to have only one end part bear against the yoke, in a cantilevered arrangement, although it is usually preferred to have both end parts supported. The second end parts of the leafs are unjoined to leave a gap between them, which can receive the terminus body below the front shoulder of the body, until the middles of the leafs bear against the front shoulder of the body. The spring member can be movable sidewardly on the yoke, to move under the body front shoulder after the body has been installed, as by sliding into a slot. The movement can be a pivoting movement of a single spring member with a plurality of leaf spring portions, to move all the spring portions at the same time. In another version of the spring member, the second end parts of the leafs, which have a gap between them, press against locations on the yoke front surface that lie on opposite sides of the slot. A portion of the body lying rearward of the front shoulder, can have flat surfaces that engage sides of the leafs or of the slot, to prevent turning of the terminus body.

Although particular embodiments of the invention have been described and illustrated herein, it is recognized that modifications and variations may readily occur to those skilled in the art, and consequently, it is intended that the claims be interpreted to cover such modifications and equivalents.

I claim:

1. An optical fiber connector that includes a housing having a yoke, for connecting to a second connector device, wherein said connector includes a terminus assembly that comprises a terminus body with a front part that is coupled to the front end of an optical fiber of an optical fiber assembly, wherein said terminus body must be capable of moving slightly forward and rearward with respect to said yoke while being biased forwardly, characterized by:

said yoke has a through hole and has front and rear surfaces facing respectively forwardly and rearwardly and spaced along said hole;

said terminus body lies in said hole and has a forward body shoulder lying forward of said yoke front surfaces;

said connector includes a spring member having a leaf spring portion with at least one leaf that has first and second opposite end parts with at least one end part which abuts said yoke front surface and that has a middle that lies forward of said yoke and that abuts said terminus body forward shoulder, said middle being resiliently deflectable rearwardly to allow said terminus body to be resiliently deflectable rearwardly.

2. The optical fiber connector described in claim 1 wherein:

said yoke has a periphery, said hole is in the form of a slot that extends sidewardly to said periphery of said yoke, said at least one leaf has a slot with a slot portion at said middle, and said slot receives said terminus body so said terminus body can lie at said middle, whereby to facilitate installation of said terminus assembly.

3. The optical fiber connector described in claim 1 wherein:

said leaf spring portion includes a pair of leafs that each have said first and second end parts that abut said yoke and that each have a middle, with the middles of said two leafs lying on opposite sides of said terminus body, and with said second end parts being spaced apart and unjoined to leave a gap to receive said terminus body.

4. The optical fiber connector described in claim 1 wherein:

said leaf spring member includes a pair of leafs and is movable on said yoke to enable said leafs to move along said opposite sides of said terminus body until said leafs lie on opposite sides of said terminus body.

5. A method for mounting a terminus assembly on a yoke of an optical fiber connector housing, where the terminus assembly includes a body coupled to the front end of an optical fiber, to resiliently urge said body forwardly, comprising:

forming said yoke with a through hole that extends between forward and rearward surfaces of said yoke;

forming said terminus body with a front part having a rearwardly-facing shoulder, and installing said terminus body in said yoke hole with said shoulder lying forward of said yoke forward surface;

mounting a sheet metal type spring which includes a pair of leafs, each having spaced first and second end parts and a bowed middle lying forward of said end parts, on said yoke forward surface, with said spaced end parts lying against locations on said yoke forward surface while said middles of said leafs lie against opposite sides of said body forward shoulder and bias said body forwardly.

6. The method described in claim 5 wherein:

there is a gap between said second end parts of said pair of leafs;

said yoke has a periphery and said hole comprises a slot extending sidewardly to said periphery;

said step of installing said terminus body includes moving it sidewardly into said slot, and along said gap in said spring.

7. An optical fiber connector for connecting the front ends of each of a plurality of optical fibers to the front ends of each of a plurality of other optical fiber devices, comprising:

a connector housing which includes a yoke having front and rear faces, and having a plurality of holes extending between said faces;

a plurality of terminus assemblies each coupled to the front end of one of said plurality of optical fibers, and each including a body lying in one of said holes of said yoke, with each body having a rearwardly-facing shoulder lying forward of said yoke front face;

a spring member mounted on said yoke and having a plurality of leaf spring portions, each including a pair of leafs that each have opposite end parts lying against said yoke front face and that each have a forwardly bowed middle which bears against said body shoulder to bias it forwardly.

8. The optical fiber connector described in claim 7 wherein:

said yoke has a center and said spring member is pivotally mounted on said yoke center to enable said spring member to pivot between a lock position wherein said leaf middles lie at positions against said body shoulders, and a release position wherein said middles lie away from the positions of said body shoulders.

9. The optical fiber connector described in claim 8 wherein:

said yoke has a periphery and said holes are in the form of slots that extend largely radially to said yoke center;

said leafs extend largely perpendicular to said slots, and said leaf second end parts are spaced to leave a gap between them, so when said spring member pivots to said lock position said leafs prevent movement of said bodies along said slot.

10. An optical fiber connector for connecting the front end of an optical fiber to the front end of another optical fiber device, comprising:

a connector housing which includes a yoke having front and rear faces, said yoke having a slot extending from said periphery and between said yoke faces;

a sheet metal-type spring coupled to said yoke and having a pair of leafs that each includes first and second end parts and a forwardly bowed middle;

a terminus body coupled to said fiber front end, said body extending forwardly through said slot and having front and rear shoulders lying respectively forward and rearward of said slot, said leaf middles lying against said forward shoulder at opposite sides of said body to bias said body forwardly, said second ends of said leafs being spaced to leave a gap therebetween through which said body can move sidewardly.

11. The optical fiber connector described in claim 10 wherein:

said leafs extends substantially perpendicular to said slot, and said spring is movable on said yoke, so after said body has been slid substantially fully into said slot, said spring can be moved to slide said leafs to received said body through said gap until said leaf middles lie on opposite sides of said body.

12. The optical fiber connector described in claim 10 wherein:

said leafs have edges adjacent to said body that extend parallel to said slot and said leaf second end parts bear against yoke forward surface locations on opposite sides of said slot, so said body can be installed by sliding it into said slot and between said leafs.

13. The optical fiber connector described in claim 12 wherein:

said slot has opposite sides, with at least one of said sides forming a ledge that engages said body to resist removal of said body from said slot.

14. The optical fiber connector described in claim 12 wherein:

at least one of said leafs has a ledge that engages said body to resist removal of said body from said slot.

15. The optical fiber connector described in claim 10 wherein:

said body has a middle part that lies in said slot and that has substantially flat opposite sides that can engage the sides of said slot to prevent turning of said body.

16. An optical fiber connector that includes a housing having a yoke, for connecting to a second connector device, wherein said connector includes first and second terminus assemblies that each comprises a terminus body with a front part that is coupled to the front end of an optical fiber of an optical fiber assembly, wherein said terminus bodies must each be capable of moving slightly forward and rearward with respect to said yoke while being biased forwardly, characterized by:

said yoke has first and second through holes and has front and rear surfaces facing respectively forwardly and rearwardly and spaced along said holes;

each of said terminus bodies lies in one of said holes and has a forward body shoulder lying forward of said yoke front surface;

said connector includes a spring member having first and second leaf spring portions, each leaf spring portion having a pair of leafs that each have first and second opposite end parts that abut said yoke front surface and that each have a middle that lies forward of said yoke, with the middles of said leafs lying on opposite sides of said terminus and abutting the corresponding terminus body forward shoulder, said middles of said leafs being resiliently deflectable rearwardly to allow the corresponding terminus body to be resiliently deflectable rearwardly, and said second end parts of said leafs being spaced apart and unjoined to leave a gap to receive the corresponding terminus body;

said spring member is movable on said yoke to enable said leafs to move along said opposite sides of said terminus body until said middles of said leafs lie on opposite sides of said terminus body;

said spring member has a hole and is pivotally mounted on said yoke about a front-to-rear pivot axis extending through said hole, to enable said pairs of leafs to simultaneously receive said bodies of said first and second terminus assemblies as said spring member is pivoted.

17. An optical fiber connector that includes a housing having a yoke, for connecting to a second connector device, wherein said connector includes a terminus assembly that comprises a terminus body with a front part that is coupled to the front end of an optical fiber of an optical fiber assembly, wherein said terminus body must be capable of moving slightly forward and rearward with respect to said yoke while being biased forwardly, characterized by:

said yoke has a through hole and has front and rear surfaces facing respectively forwardly and rearwardly and spaced along said hole;

said terminus body lies in said hole and has a forward body shoulder lying forward of said yoke front surfaces;

said connector includes a spring member having a leaf spring portion with at least one leaf that has first and second opposite end parts with at least one end part which abuts said yoke front surface and that has a middle that lies forward of said yoke and that abuts said terminus body forward shoulder, said middle being resiliently deflectable rearwardly to allow said terminus body to be resiliently deflectable rearwardly;

said yoke has a periphery, and said hole is in the form of a slot that extends sidewardly into said periphery to enable said body to be installed by sliding it into and along said slot;

said leaf spring portion includes two leafs that each have said first and second opposite end parts and a forwardly bowed middle, with the middles of said leafs lying on opposite sides of said body;

said second ends of said leaf parts lie on opposite sides of said slot, so sliding of said body along said slot can move said body shoulder in front of said middles of said leaf parts.

18. A method for mounting first and second terminus assemblies on a yoke of an optical fiber connector housing, where the terminus assemblies each includes a body coupled to the front end of an optical fiber, to resiliently urge said body forwardly, comprising:

forming said yoke with first and second through holes that each extends between forward and rearward surfaces of said yoke;

forming said terminus body with a front part having a rearwardly-facing shoulder, and installing each of said terminus bodies in one of said yoke holes, with the shoulder of each terminus body lying forward of said yoke forward surface;

mounting a sheet metal type spring which includes first and second pairs of leafs, each leaf having spaced first and second end parts and a bowed middle lying forward of said end parts, on said yoke forward surface, with said spaced end parts lying against locations on said yoke forward surface while said middles of said leafs lie against opposite sides of one of said body forward shoulders and bias the corresponding body forwardly;

said step of mounting includes mounting said spring so a center of said spring is pivotally mounted on said yoke about an axis extending in forward and rearward directions; and wherein said step of establishing said spring includes turning it about said axis to move it, until said middles of each of said pairs of leafs lie against the shoulder of one of said bodies.

19. A method for mounting a terminus assembly on a yoke of an optical fiber connector housing, where the terminus assembly includes a body coupled to the front end of an optical fiber, to resiliently urge said body forwardly, comprising:

forming said yoke with a periphery, and forming said yoke with a slot that extends between forward and rearward surfaces of said yoke, and that extends sidewardly to said periphery;

forming said terminus body with a front part having a rearwardly-facing shoulder of greater width than said slot, and installing said terminus body in said yoke hole with said shoulder lying forward of said yoke forward surface;

mounting a sheet metal type spring which includes a pair of leafs, each having spaced first and second end parts and a bowed middle lying forward of said end parts, on said yoke forward surface, with said spaced end parts lying against locations on said yoke forward surface while said middles of said leafs lie against opposite sides of said body forward shoulder and bias said body forwardly;

said pair of leafs being positioned with said second end parts spaced apart to leave a gap therebetween and lying against yoke forward surface locations on opposite sides of said slot;

said step of installing said terminus body includes sliding it along said slot and through said gap in said leaf second end parts, with said rearward shoulder sliding against said yoke rear surface and said forward shoulder sliding along said leafs and rearwardly deflecting said middles of said leafs.

\* \* \* \* \*